US009158361B2

United States Patent
Fu et al.

(10) Patent No.: US 9,158,361 B2
(45) Date of Patent: Oct. 13, 2015

(54) METHODS AND SYSTEMS FOR IMPROVING SECURITY IN ZERO-POWER DEVICES

(71) Applicants: Kevin E. Fu, Hadley, MA (US); Jacob Sorber, West Lebanon, NH (US); Mastooreh Salajegheh, Amherst, MA (US)

(72) Inventors: Kevin E. Fu, Hadley, MA (US); Jacob Sorber, West Lebanon, NH (US); Mastooreh Salajegheh, Amherst, MA (US)

(73) Assignee: University of Massachusetts, Boston, MA (US)

( * ) Notice: Subject to any disclaimer, the term of this patent is extended or adjusted under 35 U.S.C. 154(b) by 354 days.

(21) Appl. No.: 13/705,410

(22) Filed: Dec. 5, 2012

(65) Prior Publication Data

US 2013/0145199 A1 Jun. 6, 2013

Related U.S. Application Data

(60) Provisional application No. 61/566,867, filed on Dec. 5, 2011.

(51) Int. Cl.
*G06F 21/00* (2013.01)
*G06F 1/32* (2006.01)
*G06F 21/81* (2013.01)

(52) U.S. Cl.
CPC .............. *G06F 1/3212* (2013.01); *G06F 21/81* (2013.01); *Y02B 60/1292* (2013.01)

(58) Field of Classification Search
CPC ...................................................... G06F 21/81
USPC .......................................................... 726/36
See application file for complete search history.

(56) References Cited

U.S. PATENT DOCUMENTS

| | | | | |
|---|---|---|---|---|
| 5,568,441 | A | * | 10/1996 | Sanemitsu ..................... 365/229 |
| 7,852,701 | B1 | * | 12/2010 | Trimberger ................... 365/228 |
| 8,239,881 | B2 | * | 8/2012 | Harrington .................... 719/318 |

OTHER PUBLICATIONS

Clark, S.S. et al. Towards autonomously-powered CRFIDs. In Workshop on Power Aware Computing and Systems (HotPower '09), Oct. 2009: 1-5.

Holcomb, D.E., et al. Power-up SRAM state as an identifying fingerprint and source of true random numbers. Computers, IEEE Transactions on (vol. 58, Issue: 9) Sep. 2009: 1198-1210.

Lin, Y. A sub-pW timer using gate leakage for ultra low-power sub-Hz monitoring systems. Custom Integrated Circuits Conference, 2007. CICC '07. IEEE (Sep. 16-19, 2007): 397-400.

Paul, B. et al. Impact of NBTI on the temporal performance degradation of digital circuits. Electron Device Letters, IEEE (vol. 26, Issue: 8) Aug. 2005: 560-562.

Ransford, B. et al. Getting things done on computational RFIDs with energy-aware checkpointing and voltage-aware scheduling. HotPower'08 Proceedings of the 2008 conference on Power aware computing and systems, pp. 5-5.

Su, Y. et al. A Digital 1.6 pj/bit 96% stable chip-id generating circuit using process variations. IEEE Journal of Solid-State Circuits, vol. 43, No. 1, Jan. 2008: 69-77.

Swanson, R. et al. Ion-implanted complementary MOS transistors in low-voltage circuits. Solid-State Circuits, IEEE Journal of (vol. 7, Issue: 2) Apr. 1972: 146-153.

Tessier, R. et al. An energy-aware active smart card. Very Large Scale Integration (VLSI) Systems, IEEE Transactions on (vol. 13, Issue: 10) Oct. 2005: 1190-1199.

* cited by examiner

*Primary Examiner* — Longbit Chai
(74) *Attorney, Agent, or Firm* — Burns & Levinson LLP; Orlando Lopez

(57) ABSTRACT

Methods and systems for providing lime information in intermittently powered devices that are batteryless and operate purely on harvested energy (also referred to as zero power devices). The method of these teachings for improving security of zero power devices includes determining an estimate of time using a decay of data in a volatile device, and deciding whether to respond to a query based on the estimate of time.

21 Claims, 9 Drawing Sheets

METHODS AND SYSTEMS FOR IMPROVING SECURITY IN ZERO-POWER DEVICES

CROSS REFERENCE TO RELATED APPLICATIONS

This application claims priority to U.S. Provisional Application No. 61/566,867, filed Dec. 5, 2011 entitled METHODS AND SYSTEMS FOR ZERO-POWER TIME-KEEPING, which is incorporated by reference herein in Its entirety for all purposes.

STATEMENT REGARDING FEDERALLY SPONSORED RESEARCH OR DEVELOPMENT

This invention was made partially with U.S. Government support from the National Science Foundation (NSF) under contract CNS-0845874. The U.S. Government may have certain rights in the invention.

BACKGROUND

Thanks to improvements in energy harvesting technology and low-power microcontrollers, tiny sensor devices can now be built that can be deployed indefinitely with little or no required maintenance. This rising generation of devices includes RPID-scale batteryless computers that rely entirely on RF or solar energy harvested from the environment, and can be deployed in many locations that are poorly suited to traditional battery-powered devices (e.g. embedded in permanent structures and building materials and implanted in living tissues). Batteryless devices can be made smaller, cheaper, lower maintenance, and more environmentally friendly than battery-based systems; however, they also face a variety of challenges. Often these devices store only enough energy for a few seconds of operation in a tiny capacitor. Tighter energy budgets mean increased power-supply volatility and power failures as the common case instead of a rare exception. In this environment, small changes in system behavior can easily make the difference between success and failure.

A small number of systems have been designed to improve the robustness of these RFID-scale devices: using checkpointing to extend computations across failures (Mementos), and better scheduling to improve the probability that a task will complete successfully. However, time remains a significant challenge. Many sensing tasks and security-related computations are useful, only if the device has a sense of time.

Powering a real-time-clock (RTC) on such light energy budgets is often not feasible, and frequent power failures of varying duration make approximate time-estimation difficult. Requiring an external device (e.g. a RFID tag reader) to act as a time source introduces security problems and may either require significant infrastructure or severely limit range and mobility.

Providing steady power to an RFID-scale device is often an unrealistic expectation; however, a device may be able to harvest enough power to supply a low-power real-time clock (RTC).

A device using a RTC may achieve greater accuracy, but it would also require either special switching circuitry to preserve sufficient energy for the clock. In either case, the benefits of a RTC come at the cost of increased complexity, cost, and power consumption—all of which are at a premium in these tiny sensors, There is a need for methods and systems for providing time information in intermittently-powered devices that are batteryless and operate purely on harvested energy.

BRIEF SUMMARY

Methods and systems for providing time information in intermittently powered devices that are batteryless and operate purely on harvested energy (also referred to as zero power devices) are presented hereinbelow.

In one or more embodiments, the method of these teachings for improving security of zero power devices includes determining an estimate of time using a decay of data in a volatile device, and deciding whether to respond to a query based on the estimate of time.

In one or more embodiments, the system of these teachings for improving security of zero power devices includes a volatile device, at least a portion of the volatile device storing known data, a data acquisition component operatively connected to the volatile device, an output of the data acquisition component being acquired data from said at least a portion of the volatile device, a time estimation component configured for determining an estimate of time using a decay of data in a volatile device, the time estimation component receiving the output of the data acquisition component, and a decision component configured for deciding whether to respond to a query based on the estimate of time.

Various other embodiments are disclosed.

For a better understanding of the present teachings, together with other and further objects thereof, reference is made to the accompanying drawings and detailed description and its scope will be pointed out in the appended claims.

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a", "an," and "the" include the plural reference unless the context clearly dictates otherwise.

In order to elucidate the present teachings, the following definitions are provided.

A "volatile device" as used herein, is a device that can store data and in which data stored in the device decays when the power is not being supplied to the device (a zero power condition). Examples of volatile devices include, but are not limited to, SRAMs and capacitors, An "electric water clock (eWC)," as used herein, is a timing component that uses the predictable decay characteristics of volatile devices in a system to estimate the passage of time.

The following definitions are provided for an SRAM as a volatile device but would apply to any volatile device:

| Term | Definition |
| --- | --- |
| SRAM Decay | Change of value in SRAM cells because of power outage |
| Decay Stage 1 | Time before the first SRAM cell decays |
| Decay Stage 2 | Time between the decay of first SRAM cell and last one |
| Decay Stage 3 | Time after the last SRAM cell decays |
| Ground State | The state that will be observed in an SRAM cell upon power-up, after a very long time without power |
| DRV | Data Retention Voltage, minimum voltage at which each cell can store a datum |
| DRV Probability(v) | Probability that a randomly chosen cell will have a DRV equal to v and a written state that is opposite its ground state |

Figure 3:
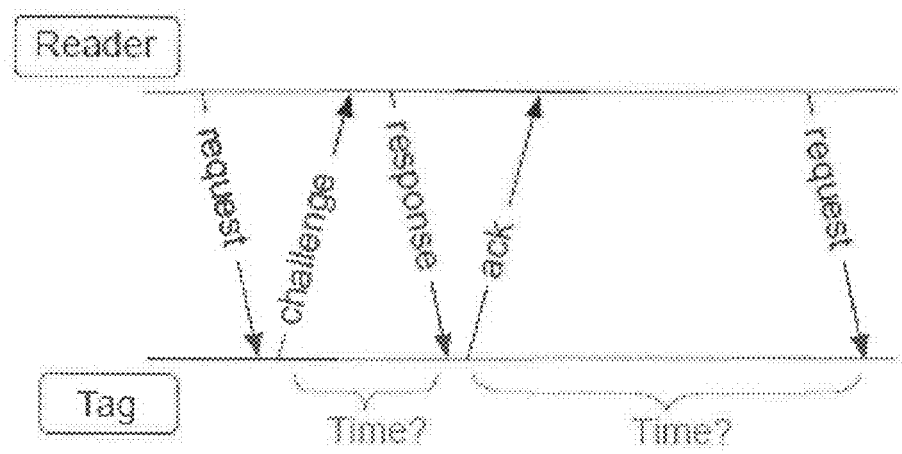
FIG. 3 depicts a typical secure communication between a reader and a tag.

New mobile applications with strict size and cost constraints, as well as recent advances in low-power microcontrollers, have given rise to a new class of intermittently powered device that Is batteryless and operates purely on harvested energy. These devices—including contact and contactless smart, cards and computational RFID tags (CR-FIDs)—typically have limited computational power, rely on wireless transmissions from a reader both for energy and for timing information, and lose power frequently due to minimal energy storage. For example, when a contactless transit card is brought sufficiently close to a reader in a subway, the card gets enough energy to perform the requested tasks. As soon as the card is out of the reader range, it loses power and is unable to operate until presented to another reader. Since a tag loses power in the absence of a reader, it doesn't have any estimation of time between two interactions with a reader. A typical secure communication between a reader and a tag is shown in FIG. 3. The tag will only respond to the reader's request if it has authenticated itself by correctly answering the challenge sent by the tag. Two problems arise in this scheme:

1) The tag is unaware of the amount of time spent by the reader to answer the challenge, so an adversary has an unlimited amount of time to crack a challenge.
2) The tag is unaware of the time between two different queries, so an adversary can send a large number of queries to the tag in a short time space. This can make various brute-force attacks possible on these devices.

Traditionally, computing devices have either had a direct connection to a reliable power supply or large batteries that mask disconnections and maintain a constant supply of power to the circuit. The present teachings do not require a reliable power supply or large batteries that mask disconnections and maintain a constant supply of power to the circuit.

In one embodiment capacitance and other remanence properties inherent in today's embedded systems are used to build analog electrical clocks, or electric water clocks (eWC), that estimate time in batteryless sensor devices. Conceptually similar to ancient water clocks, an eWC uses the predictable decay characteristics of its hardware components to estimate the passage of time.

In one specific instance of an eWC, the SRAM Clock uses the data remanence properties of SRAM to estimate the amount of time since the CPU last supplied power to the RAM. Initial experimental results and a physical model to justify the choice of electric water clock are provided. For a TI MSP430, time of power failures up to 4 seconds can be measured without any hardware modifications. Experiments also show that decreasing the temperature increases the data remanence time. The immediate applications that can benefit from electric water clocks are security protocols that must determine when an interaction with a second party should time-out. Techniques for extending the measurable time range of an eWC using custom hardware in order to support a wider range of time-keeping applications are also disclosed.

In one or more embodiments, the system of these teachings for improving security of zero power devices includes a volatile device, at least a portion of the volatile device storing known data, a data acquisition component operatively connected to the volatile device, an output of the data acquisition component being acquired data from said at least a portion of the volatile device, a time estimation component configured for determining an estimate of time using a decay of data in a volatile device, the time estimation component receiving the output of the data acquisition component, and a decision component configured for deciding whether to respond to a query based on the estimate of time.

In one instance, the time estimation component and the decision component are comprised by one or more processors and one or more computer usable media, the one or more computer usable media having computer readable code embodied there in that causes the one or more processors to determine an estimate of time using a decay of data in a volatile device and decide whether to respond to a query based on the estimate of time.

In another instance, the data acquisition component is comprised by the one or more processors and computer readable code embodied in the one or more computer usable media that causes the one or more processors to read data stored in the volatile device.

In one embodiment, the computer readable code, in causing the one or more processors to decide whether to respond to a query, causes the one or more processors to determine if the estimate of time is greater than a predetermined time and respond to a query only if the estimate of time is less than or equal to the predetermined time.

In another embodiment, the computer readable code, in causing the one or more processors to decide whether to respond to a query, causes the one or more processors to determine whether data in the volatile device has substantially decayed and respond to the query if the data in the volatile device has substantially decayed. In one instance of that other embodiment, the computer readable code, in causing the one or more processors to decide whether to respond to a query, causes the one or more processors to set at least a portion of the volatile device to a predetermined data value, after responding to the query. In another instance of that other embodiment, the system also includes an alarm component, the alarm component providing an alarm if the volatile device has not substantially decayed, if an alarm is provided, the computer readable code, in causing the one or more processors to decide whether to respond to a query, causes the one or more processors to, in one embodiment, respond to the query or, in another embodiment, not respond to the query. Each of the two above embodiments corresponds to different security applications.

In yet another embodiment, the system also includes a counter, the counter being initialized to a predetermined count and the computer readable code, in causing the one or more processors to decide whether to respond to a query, causes the one or more processors to:
a) Determine whether data in the volatile device has substantially decayed;
b) not respond to a query if the data in the volatile device has not substantially decayed;
c) decrease the predetermined count by a predetermined decrement if the data in the volatile device has substantially decayed;
d) determine whether the counter is zeroed;
e) repeat (a) through (d) if the counter is not zeroed; and
f) respond to their query if the counter is zeroed.

The above embodiment can introduce a large delay between queries.

In a further embodiment, the volatile device is an SRAM. In one instance, at least one capacitor placed in parallel with the SRAM. Capacitors can greatly extend the resolution time of the eWCs using SRAM as the volatile device.

Figure 1:
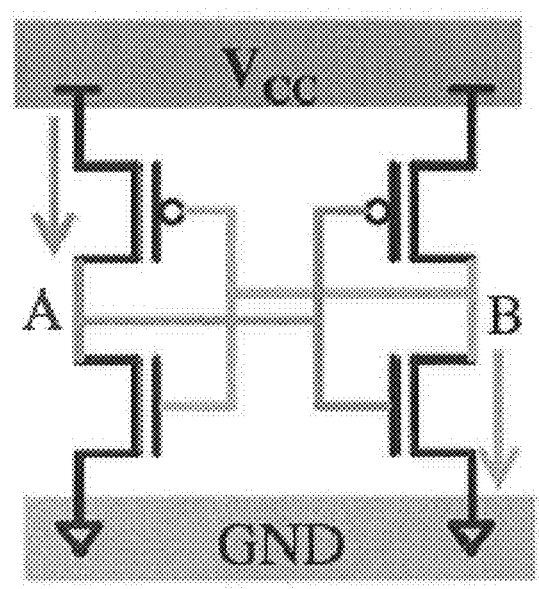
FIG. 1 depicts a component of one embodiment of the system of these teachings.

SRAM cells are among the most common building blocks of digital systems. The ubiquity of SRAM is due in part to ease of integration; in contrast with flash memory and DRAM, SRAM requires only a simple CMOS process and nominal supply voltage. Each SRAM cell holds state using two cross-coupled inverters as shown in FIG. 1; two access transistors that control reading and writing to the cell are omitted from the figure. The cross-coupled inverters are powered via connections to the chip's power grid. While powered, one node among A and B holds a one, and the other holds a zero. The state shown in FIG. 1 represents a stored value of one; in this state, the upper-left PMOS device constantly pulls node A up to one, and the lower-right NMOS device pulls node B down to zero. This comprises a positive feedback loop that makes the stored state robust to noise and leakage.

Discharging the chip's power grid destroys the positive feedback of the SRAM cell, allowing the stored state to decay as charge leaks off of the storage nodes. If power is reapplied quickly before too much charge has leaked away, the positive feedback will restore the partially-decayed voltages back to full-swing. If the power remains off for a long time, then nearly all charge is leaked from the storage node, and a subsequent powerup causes the cell to stabilize to a value that is independent of previous state. The proposed electric water clock estimates time between power-ups by measuring the fraction of cells that retain their state across the power-down.

Figure 4:
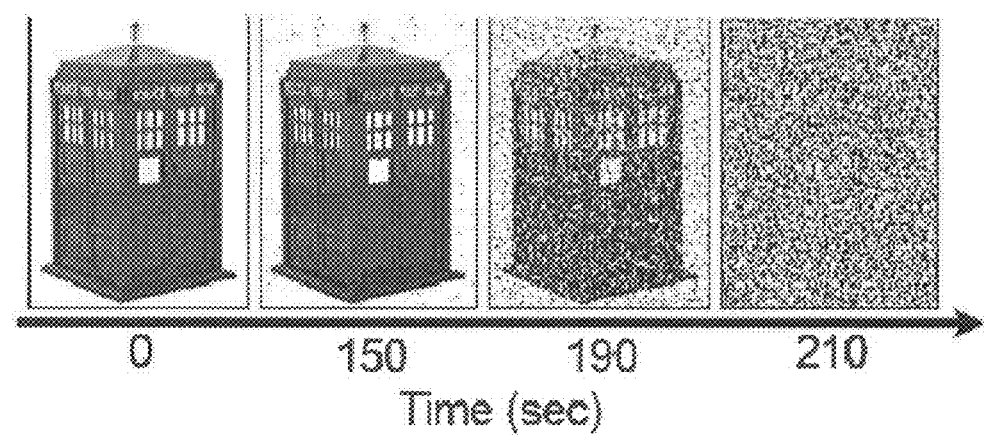
FIG. 4 is a graphical representation of the effect of time on SRAM decay in the absence of power for an image stored in one embodiment of the system of these teachings.

The specific instance of the eWC, the SRAM Clock, exploits SRAM decay during a power-off to estimate time. An example of the effect of time on SRAM decay in the absence of power is visualized in FIG. 4. In this exemplary embodiment, a 100×135 pixel bitmap image was stored into the SRAM of a TI MSP430 microcontroller. The contents of the memory were read 150, 190, and 210 seconds after the power was disconnected. The degree of image distortion is a function of the duration of power failure.

Figure 2A:
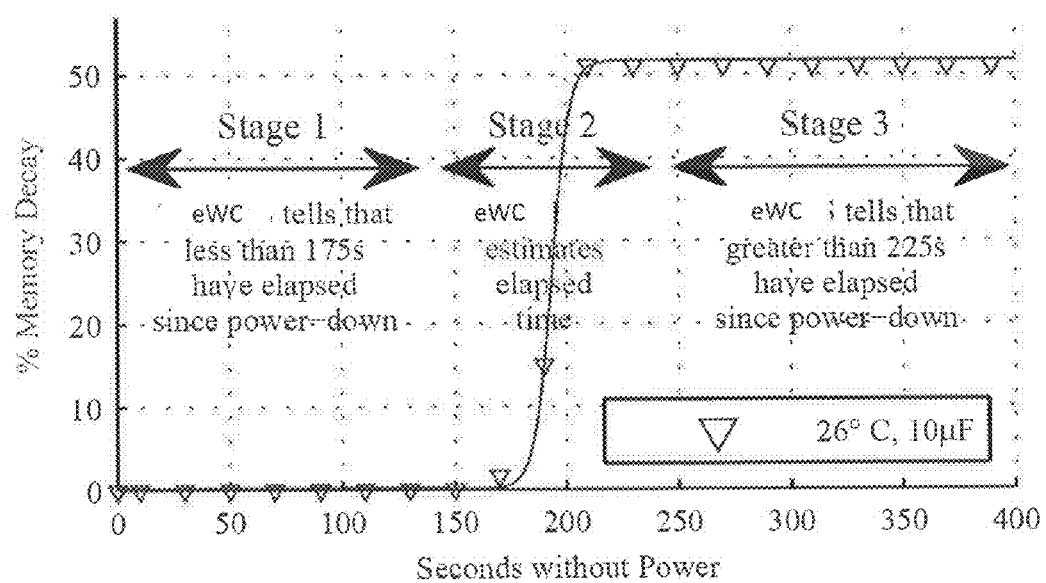
FIGS. 2a, 2b show remanence versus time for the component of FIG. 1.

FIG. 2a shows the general mechanism of the SRAM Clock. When a lag is powered up, the SRAM Clock initializes a region in SRAM cells to 1. Once the power is cut off, the SRAM cells decay and their value might reset from 1 to 0. The next time the tag is powered up the SRAM Clock tracks the time elapsed after the power loss based on the percentage of cells remaining 1, Algorithm 1 gives more details about the implementation of the SRAM Clock.

---
Algorithm 1 - SRAM Clock Implementation
---

```
INIT(addr; size)
1 for i 1 to size
2 do memory(addr+i−1) ←0xFF
<-
3 temperature←MEASURE_TEMPERATURE( )
DECAY(addr; size)
1 decay←COUNT0S(addr; size)
2 _ Proc. COUNT0S counts the number of 0s in a byte.
3 if TEMPERATURE ANALYZE(temperature)
4 _ This procedure decides if the temperature changes
  are expected considering the history of temperature
  values stored in flash memory.
5 then return decay
6 else return error
EXPIRED(addr; size)
1 _ Checks whether SRAM decay has finished.
2 decay ←DECAY(addr, size)
3 if (decay ≥ %50x8xsize)
4 then return true
5 else return false
TIME(addr; size; temperature)
1 _ Estimate the passage of time by comparing the
  percentage of decayed bits to a precompiled table.
2 decay←DECAY(addr, size)/(8xsize)
3 time←ESTIMATE(decay, temperature)
4 return {time; decay}
```

MEASURE TEMPERATURE: To detect and compensate for temperature changes that could affect the decay rate, the SRAM Clock uses the on-board temperature sensor found on most microcontrollers. The procedure MEASURE TEMPERATURE stores inside-the-chip temperature in the flash memory upon power-up. The procedure DECAY calls the TEMPERATURE ANALYZE function to decide if the temperature changes are normal. TIME: The SRAM Clock TIME procedure returns time and decay. The precision of the time returned can be derived from the decay. If the memory decay has not started (decay=0), the procedure returns {time; 0} meaning that the time duration is less than time. If the SRAM decay has started but has not finished yet (0≤decay≤50%), the return value time is an estimate of the elapsed time based on the decay. If the SRAM decay has finished (decay is about equal to 50%), the return result is {time; 50} meaning that the time elapsed is greater than time. ESTIMATION: The procedure ESTIMATE uses a lookup table filled with entries of decay, temperature, and time stored in non-volatile memory. This table is computed based on a set of experiments on SRAM in different temperatures. Once the time is looked up based on the measured decay and the current temperature, the result is returned as time by the ESTIMATE procedure.

It should be noted that the above algorithm can be used, with minimal modification, for other eWCs.

Physics of SRAM Remanence:

Remanence is a function of how quickly a chip's power grid discharges when the chip is powered-down. To a first order approximation the grid can be viewed as an RC circuit, with the voltage at t seconds after power-down given, by $$V_{CC} e^{-t/RC}$$

Figure 8:
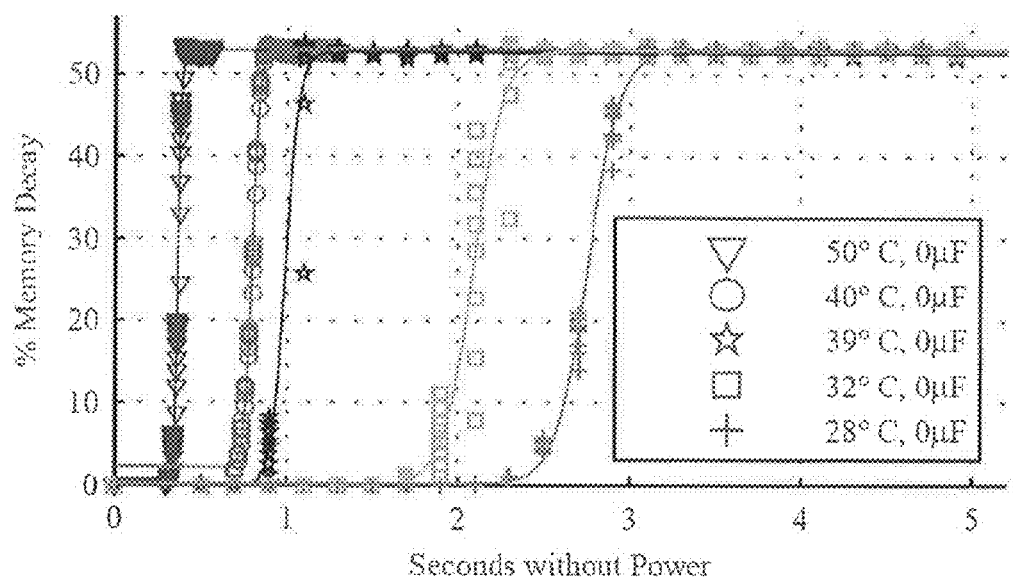
FIG. 8 is a graphical representation of the variation of the percentage of memory decay as a function of time for various SRAM temperatures.

Impact of Temperature: It has been previously shown that low temperature can increase the remanence time of SRAM, and, similarly, it has been previously shown that low temperature can extend the remanence time of DRAM For the SRAM clock using SRAM decay to provide a notion of time, the opposite case of whether high temperature can decrease remanence is of interest. The circuit of FIG. 5 (without using capacitors) was used to investigate how decay time varies across five different elevated temperatures (in the range of 28° C.-50° C.). The off-time of the microcontroller varied from 0 to a maximum of 5 seconds. FIG. 8 shows that the decay time is non-zero across all temperatures. This indicates that the SRAM clock could work at various temperatures as long as changes in the temperature are compensated for. For the SRAM clock, this compensation is done by using temperature sensors which are available in many of the today's microcontrollers.

A power-down is considered herein to be an open circuit connection at the power input pin of the chip, as would result from disconnecting an external power supply. The decoupling capacitance that stabilizes the supply voltage during normal operation must discharge at power-down, and the only discharge paths are high impedance leakage paths. This corresponds to a large RC time constant in the exponential decay equation given above, (FIG. 1 shows the state-holding portion of an SRAM Cell, which, consists of two cross-coupled inverters tied to the chip's power supply network.)

Accordingly, the disconnecting of external power begins a relatively slow exponential decay of the supply voltage. At the early stages of supply voltage decay, SRAM cells maintain a (weakened) positive feedback that prolongs the remanence of the stored data.

An illustrative embodiment setup and illustrative embodiment results are presented hereinbelow in order to further elucidate these teachings.

Illustrative Embodiment Setup

A microcontroller, a TI MSP430F2131 in the instances presented, with 256 Bytes of RAM runs a program that sets all available bits to one. Then the power is effectively disconnected for a certain amount of time (off-time). When power is reapplied to the chip, the program begins anew by reading the RAM contents and writing to flash memory the percentage of RAM bits containing a one value. The program then resets the RAM bits to one in preparation for estimating the next power-off duration.

A Data Acquisition (DAQ) unit, a DAQ unit from Agilent in the instances presented, precisely controls the experiment timing. The DAQ sweeps the off-time from 2 seconds to 10 seconds. After each power-off, the program records the percentage of remaining 1-bits and then resets all bits to one. Modeling a disconnected power supply is accomplished by connecting a diode inline between the DAQ output and the VCC input of the microcontroller; this prevents the DAQ from grounding VCC during the off-time when the DAQ) is still physically connected but is not supplying power.

Figure 5:
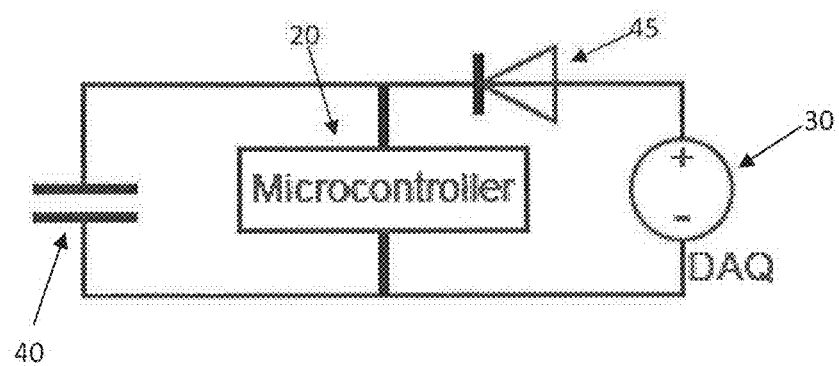
FIG. 5 is a schematic representation of a circuit used in the illustrative embodiments.

The circuit used in the illustrative embodiments presented herein is shown in FIG. 5. Referring to FIG. 5, in the embodiment shown therein, a microcontroller 20 is used to set and provide the SRAM, a DAQ 30 controls the timing of power ups and power downs and measure the voltage across a microcontroller, a capacitor 40 is provided for measurements involving a capacitor and in-line diode 45 between the DAQ, which also acts as a power supply, and the microcontroller provides the same behavior as found in RFID tags and also prevents grounding problems.

Figure 2B:
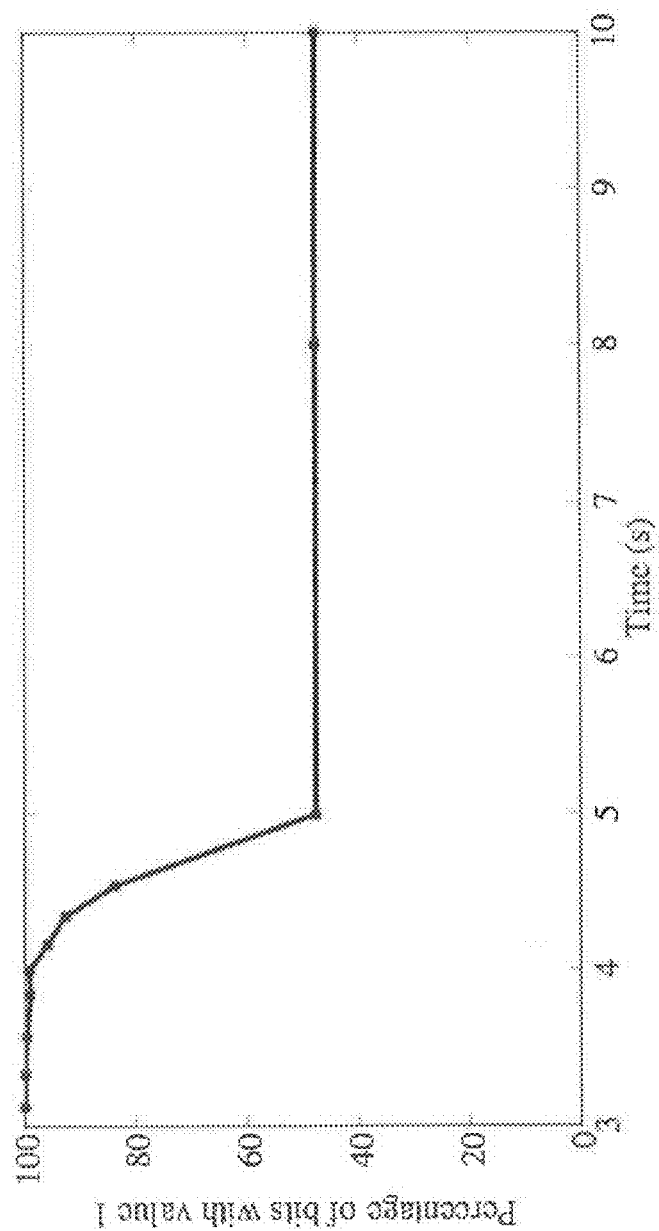

Illustrative Embodiment Results; The results for the illustrative embodiment for 30 trials is shown in FIG. 2b, FIG. 2b shows results of Remanence vs. time. The percentage of bits that retain their 1-value across a power-off is almost 100% for times up to 4 seconds, the initial state is random if the power-off exceeds 5 seconds. The data indicates that the SRAM cells take between 4 and 6 seconds to decay after power is removed. (Setting the VCC to 0 V during the power-down reduces remanence time by at least an order of magnitude. This is also observed in the result presented herein below.) At any power-up, observing the percentage of bits that remain one makes it possible to estimate the duration of the preceding power failure. For example, if 90% of the cells remain at one, then it has been about four seconds since the beginning of the power failure.

The remanence time of a chip is influenced by temperature and capacitance. The present experiments, as well as others, show that decreasing temperature causes remanence time to increase. For an off time of 4.5 seconds, only 84% of the bits remained one at room temperature, while 95% of the bits remained one at low temperature (microcontroller was kept in a cooler for 15 minutes). The increase in remanence indicates a slower discharging of the power grid that is likely due to a reduction in MOSFET leakage currents at low temperature. The lower current can be considered as a higher effective resistance R in the decay equation. The same effect of increasing the RC time constant can be achieved by increasing C using additional explicit capacitance. One can thus tune the electric water clock by adjusting the amount of capacitance applied to the supply grid.

Capacitors can greatly extend the resolution time of the eWCs using SRAM as the volatile device. In one exemplary embodiment, five different capacitors ranging from 10 mF to 10 mF at 26:5° C. were tested. In this exemplary embodiment, the capacitors were fully charged in the circuit and their voltage decay traces were recorded. These traces were later used in conjunction with remanence vs.—decay results to calculate the time frame achievable with each capacitor. Table 1 summarizes the results for the duration of eWCs Stage 1 and 2 based on capacitor size. The voltage decay traces, the conversion function (DRV Prob.) and the resulting SRAM-decay over-time graph can be seen in FIGS. 6(a)-6(c).

TABLE 1

| Cap. Size | Stage 1 (s) | Stage 2 (s) |
|---|---|---|
| 0 mF | 1.22e0 | 8.80e−1 |
| 10 mF | 1.75e2 | 5.00e1 |
| 100 mF | 1.13e3 | 8.47e2 |
| 1000 mF | 1.17e4 | 9.50e3 |
| 10000 mF | 1.43e5 | >5.34e4 |

Figure 6:
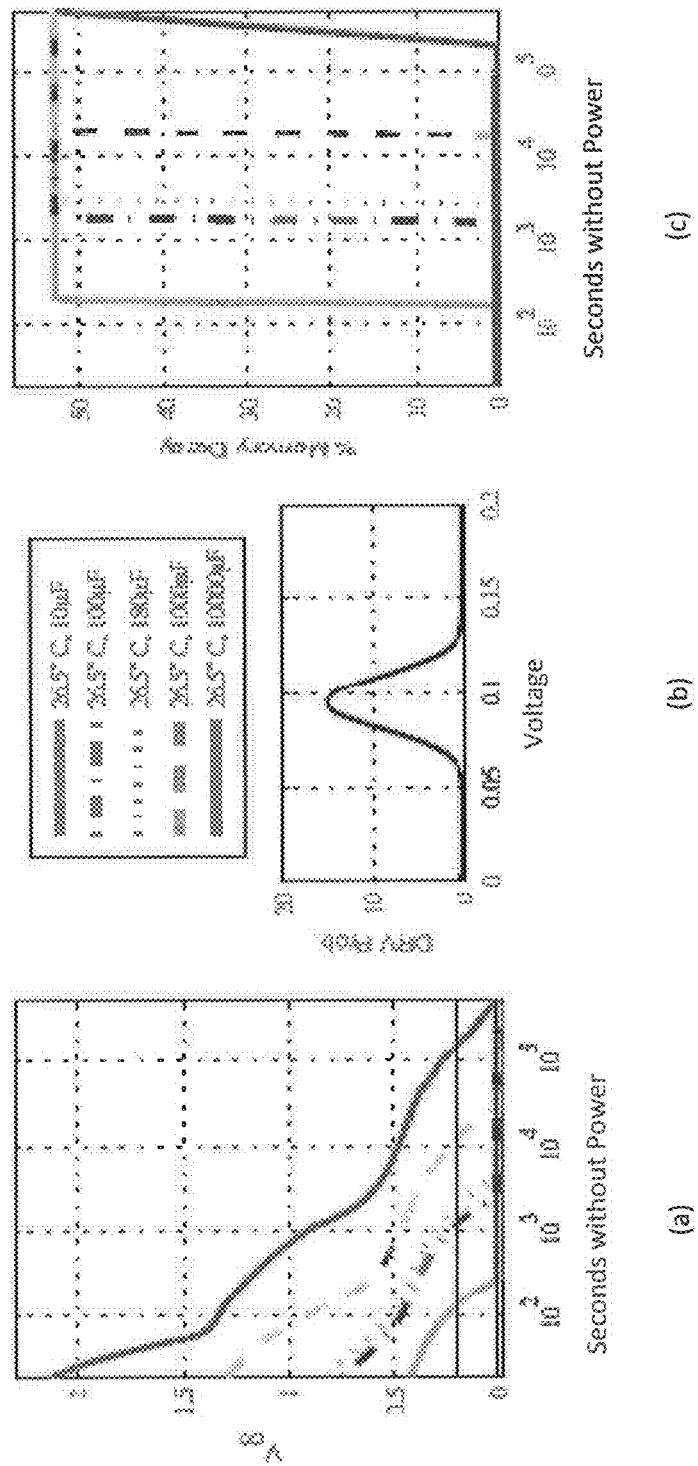
FIGS. 6(a)-6(c) show voltage decay traces, the conversion function (DRV Prob.), and the resulting SRAM-decay overtime graph for various capacitor sizes.

Referring to FIGS. 6(a)-6(c). For five different capacitor values, measured supply voltage traces are combined with a pre-characterized Data Retention Voltage (DRV) distribution to predict decay as a function of time. The decaying supply voltages after power is turned off are shown in FIG. 6(a). The DRV probabilities for 26:5° C. are shown in FIG. 6(b). The memory-decay-vs.-time plots shown in FIG. 5(c). The two horizontal lines in FIG. 6(c) at approximately 150 and 50 mV are the voltages where the first and last bits of SRAM will respectively decay.

Results ranging from seconds to days open the path for a wide variety of applications for the eWCs, as it can now be tweaked to work in a specific time frame. Current RFID-scale devices generally use capacitors ranging from tens of picofarads to tens of microfarads. Although a 10 mF capacitor size might be large compared to the size of today's transiently powered devices, the progress in capacitors' size and capacity may very well make their use possible in the near future.

Many promising applications for RFID-scale devices need to know how long has passed since a power failure. For example, an RFID-enabled credit card authenticating a reader needs to know if a time out has passed. As another example, consider a low-power checkpointing system like the system disclosed in B. Ransford, J. Sorber, and K. Fu. Mementos: System support, for long-running computation on RFID-scale devices. In Proceedings of the 16th Architectural Support for Programming Languages and Operating Systems (ASPLOS 2011), Newport Beach, Calif., March 2011, incorporated by reference herein in its entirety and for all purposes. Such a system can schedule its checkpoints better if it knows the average time of power failure even without high precision.

For exemplary purposes, not a limitation of these teachings, two classes of applications that can benefit from a zero-power clock are presented below. One is security applications that need to know if a time out has happened or not. The other one is sensing applications that need to timestamp the sensed data.

Security, Many of the earliest applications of RFID scale computers centered around security—bringing strong encryption to improve RFID security and privacy. However, time plays a critical role in ensuring the security of many systems. Expiring a financial transaction after a fixed timeout limits an attacker's window of opportunity. Many systems also evolve cryptographic keys over time in a manner that is predictable only by those who know the original key.

There are many cases where the security of real-world applications has been broken because the adversary could query the device as many times as required for attack. By integrating the eWC of these teachings, these applications could throttle their response rates and improve their security.

In one or more embodiments, the method of these teachings for improving security of zero power devices includes determining an estimate of time using a decay of data in a volatile device, and deciding whether to respond to a query based on the estimate of time.

In one instance, deciding to respond to a query includes determining if the estimate of time is greater than a predetermined time and responding to a query only if the estimate of time is less than or equal to the predetermined time.

In another instance, deciding to respond to a query includes determining whether data in the volatile device has substantially decayed and responding to the query if the data in the volatile device has substantially decayed. In one embodiment of that other instance, deciding to respond to a query also includes setting at least a portion of the volatile device to a predetermined data value, after responding to the query.

In another embodiment of that other instance, the method of these teachings also includes providing an alarm, if the volatile device has not substantially decayed. After providing the alarm, the method of these teachings includes, in one embodiment, responding to the query or, in another embodiment, not responding to the query. Each of the two above embodiments corresponds to different security applications.

In yet another instance, the method of these teachings also includes initializing a counter to a predetermined count and deciding to respond to a query includes:
 a) determining whether data in the volatile device has substantially decayed;
 b) not responding to a query if the data in the volatile device has not substantially decayed;
 c) decreasing the predetermined count by a predetermined decrement if the data in the volatile device has substantially decayed;
 d) determining whether the counter is zeroed;
 e) repeating (a) through (d) if the counter is not zeroed; and
 f) responding to their query if the counter is zeroed.
The above embodiment can introduce a large delay between queries.

Six exemplary security protocols that could strengthen their defense against brute-force attacks by using the eWC of these teachings are presented below. To demonstrate the ease of integrating the eWC of these teachings, three of these security protocols have been implemented and tested on a batteryless microcontroller-based RFID tag with sensors but without a clock. The prototypes demonstrate the feasibility of the eWC of these teachings and its capabilities in practice.

Sleepy RFID Tags: To preserve the users privacy and prevent traceability, one could use a "kill" command to permanently deactivate RFID tags on purchased items.

However, killing a tag disables many features that a customer could benefit from after purchase. For example, smart, home appliances (e.g., refrigerators or washing machines) may no longer interact with related items even though they have RFID tags in them. One could temporarily deactivate RFID tags by putting them to "sleep." However, lack of a simple and practical method to wake up the tags has made this solution inconvenient. By providing a secure notion of time, the eWC of these teachings makes it possible to implement sleepy tags that can sleep temporarily without requiring additional key PINs or cryptographic solutions. A time resolution on the order of hours is considered more appropriate for this application. To extend the sleep time of sleepy tags, a counter is used along with the eWC of these teachings as follows: upon powerup, the tag checks the eWC of these teachings timer, and it does not respond to the reader if the timer has not expired. If the eWC of these teachings timer has expired, the tag decreases the counter by one and Initializes the eWC of these teachings again. This loop will continue while the counter is not zero. For example, using a counter initially set to 1000 and a eWC resolution time of 10 seconds, the tag could maintain more than 2 hours of delay. Since the tag exhausts its counter every time it wakes up, the reader interacting with the tag has to query the tag intermittently. The eWC of these teachings could prevent yet another attack on Electronic Product Code (EPC) tags that use "kill" commands.

To prevent accidental deactivation of tags, a reader must issue the right PIN to kill a tag. An adversary could brute-force the PIN (32 bits for EPC Class 1 Gen2 tags). The eWC of these teachings enables the RFID tag to slow down the unauthorized killing of a tag by increasing the delay between queries and responses.

Squealing Credit Cards: Today, a consumer cannot determine if her card has been used more than once in a short period of time unless she receives a receipt. This is because a card cannot determine the time elapsed between two reads as the card is powered on only when it communicates with the reader. The eWC of these teachings enables a "time lock" on the card such that additional reads would be noticed. Thus a consumer could have some assurance that after exposing a card to make a purchase, an accidental second read or an adversary trying to trick the card into responding would be revealed. Squealing credit cards would work similarly to today's credit cards, but they are empowered by the eWC of these teachings to estimate the time between queries and warn the user audibly (a cloister bed) if a second read is issued to the card too quickly. A time lock of about one minute can be considered enough for these applications.

Forgiving E-passports: RFID tags are used in epassports to store holder's data such as name, date of birth, biometric ID, and a unique chip ID number. Epassports are protected with techniques such as the Basic Access Control (BAC) protocol, shielding, and passive authentication. However, in practice, e-passports are not fully protected. An adversary can brute-force the BAC key in real time by querying the passport 400 times per minute for a few weeks. Another attack can accurately trace a specific passport by sending hundreds of queries per minute. To mitigate the effect of brute-force attacks, French e-passports have implemented a delay mechanism— for example, using a counter—to throttle, the read rate. This delay increases to 14 seconds after 14 unsuccessful attempts and would occur even if the passport was removed from the RF field for several days. Once the tag is presented with an authorized reader, the delay will be enforced and then reset to zero. The eWC of these teachings provides a time-aware alternative that delays unauthorized access but ignores the previous false authentication attempts if the passport has been removed from the reader's range or an appropriate duration. A time duration matching the maximum implemented delay (14 seconds for French passports) would be enough to implement this function.

Passback—Double-tap Prevention: In mass transportation and other similar card entry systems, the goal of the operator may be to prevent multiple people from accessing the system simultaneously using the same card. To achieve this goal, systems are typically connected to a central database that prevents a card from being used twice in a short time frame. Using the eWC of these teachings, a card could implement delay before permitting re-entry rattier than requiring the system to check a central database.

Resurrecting Duckling: Secure communication in adhoc wireless networks faces many obstacles because of the low computing power and scarce energy resources of these devices. Stajano et al. (STAJANO, F., AND ANDERSON, R. The resurrecting duckling: Security issues for ad-hoc wireless networks. In Security Protocols, B. Christiansen, B, Crispo, J. Malcolm, and M. Roe, Eds., vol. 1796 of Lecture Notes in Computer Science. Springer, 2000, pp. 172-182) proposed a policy in which these devices would transiently accept a new owner. The devices will later return to an unprograramed status when the owner no longer needs them, they receive a kill command, or another predefined reset condition is met. Later, others can reclaim and reuse these devices. For wirelessly powered devices, the eWC of these teachings can provide a sense of time, allowing them to be "reborn" with a new owner only if there is an extended power outage. A legitimate user can continue to power the device wirelessly, but if she wishes to transfer ownership to another entity, she must power it down for a long enough time (defined by the user). Otherwise, the RFID tag refuses to interact with anyone not possessing the present cryptographic key.

An example of this application is secure pairing for computational contact lenses (HO, H., SAEEDI, E. KIM, S., SHEN, T., AND PAR VIZ, B., Contact lens with integrated inorganic semiconductor devices, IEEE 21st International Conference on Micro Electro Mechanical Systems, 2008, MEMS 2008, (January 2008), pp. 403-406). The controller could be cryptographically bound until power disappears for more than a few minutes. Another use of this application is to make stealing SIM cards difficult. The card could refuse to boot if it has been unpowered for a selected amount of time.

Time-out in Authentication Protocols: Because RFID tags rely on a reader as their source of energy, they cannot measure the delay between a request to the reader and its corresponding response. The tag ignorance gives the reader virtually unlimited time to process the request and response in an authentication algorithm. Having unlimited response time enables the adversary to employ various attacks on the request message with the goal of breaking it. Using the eWC of these teachings will limit the adversary time frame for a successful attack. An example of these protocols can be seen in the e-passport BAG protocol where the reader and passport create a session key for communication. Using the eWC of these teachings would enable passports to enforce expiration of these keys.

Scientific and Health Sensing. Despite their small size, transitively-powered computing devices have, so far, been poorly suited to many scientific and medical sensing applications. Whether monitoring environmental conditions or a diabetic patient's blood-glucose level, sensed data is often useless without also knowing when the reading was collected.

Applications of these teachings could reduce the risk of double spending of electronic cash. Today, a consumer's wallet will allow anyone to read the credit card number from a contactless card. These teachings would enable a "time lock" such that the card would refuse to allow further interrogation for a set number of seconds. Thus, a consumer could have some assurance that after exposing a card to make a purchase, an adversary cannot trick die card into responding.

For digital rights management, applications of these teachings could implement a throttle on how often the content could be read. This would slow (but not stop) the spread of content piracy.

It should be noted that, although the exemplary embodiments include only one volatile device (such as one SRAM), the present teachings also apply to embodiments in which one or more volatile devices (such as one or more SRAMs) are used to Increase the accuracy of the estimate of time.

Applications of these teachings could result in a lower cost alternative to existing technology. For instance, a smart card could implement a "replay cache" to detect an attacker trying to re-use an expired credential. A replay cache requires the smartcard card to write a value to flash memory to remember an attacker's attempt. But flash memory typically requires twice the voltage of SRAM. These teachings would allow smartcards to eliminate flash memory writes during operation—saving further power and manufacturing cost.

Applications of these teachings to Implantable medical devices could better implement security systems without having to draw power from its main battery.

Analog time-keeping, using an eWC, has the potential to make sensing applications a reality in spite of frequent power failures. Using an eWC, RFID-scale sensors can attach an approximate time stamp to each data point. This timing information can also be used to average sensor readings gathered within a particular time window.

In order to further elucidate these teachings, an exemplary embodiment of security applications is presented herein below. It should be noted that these teachings are capable of many other embodiments and are not limited to only the exemplary embodiments.

For the implementation of sleepy tags, squealing credit cards, and forgiving e-passports, the Moo, a batteryless microcontroller-based RFID tag, (ZHANG, H., GUMMESON, J., RANSFORD, B., AND FU, K, Moo: A batteryless computational RFID and sensing platform, Tech. Rep. UM-CS-2011-020, Department of Computer Science, University of Massachusetts Amherst, Amherst, Mass., June 2011) was chosen. This tag has been augmented with an alert component, a piezo-element in one embodiment, so that it can (audibly in one embodiment) alert the user to events.

Figure 7:
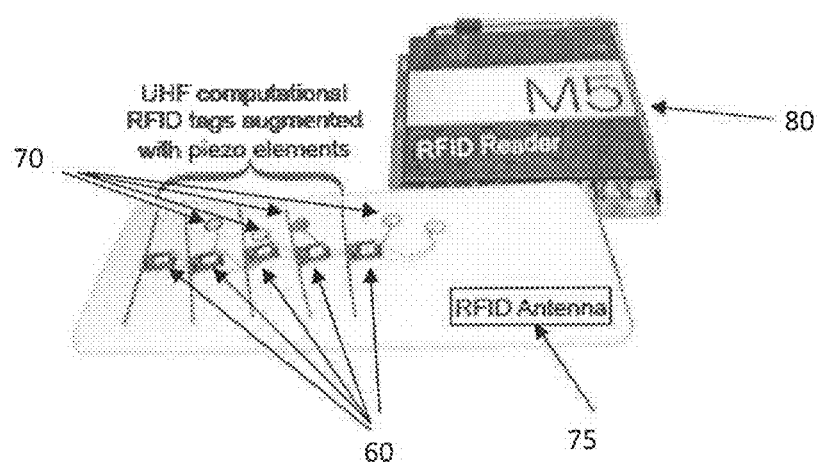
FIG. 7 is a pictorial representation of a system configuration for implementing embodiments of security applications.

The above detailed security applications were implemented using the configuration shown in FIG. 7. Referring to FIG. 7, in the embodiment shown therein, each of the microcontroller based RFID tags 60 has a piezoelectric element 70 connected to RFID tag 60, An RFID antenna 75 and an RFID reader 80 are used to query the RFID tags 60.

An exemplary implementation is disclosed hereinbelow. It should be noted that these teachings are not limited only to this exemplary implementation.

Exemplary Implementation: An eWC library has been implemented that provides the procedures INIT and EXPIRE listed in Algorithm 1, shown below.

---
Algorithm 2: An example of eWC usage in a protocol
---
```
eWC EXAMPLE(addr; size)
1 if EXPIRED(addr,size)
2 then RESPOND TO READER( )
3 INIT(addr,size)
    4   else BUZZ PIEZO ELEMENT( )
```
---

For the three implemented protocols, a 1-bit precision of time—whether or not the timer had expired—was enough. The programs used for all three protocols are similar and are shown, in Algorithm 2. The tag was programmed to call the EXPIRE procedure, that Checks whether the volatile device decay has finished, upon power-up; if the timer had expired, it would respond to the reader and call INIT, that initializes the volatile device; otherwise, the tag would buzz its piezo-element. In the case of the squealing credit cards protocol the tag was programmed to respond to the reader after buzzing, but for the two other applications, the tag stopped communicating with the reader.

In the exemplary embodiment, an RFID reader and its corresponding antenna were used to query the tag. When the tag was queried for the first time upon removal from the RF field. It buzzed. The tag stayed quiet whenever it was queried constantly or too quickly.

Although the above presented exemplary embodiments focus on using data remanence in SRAM to keep time, since SRAM is already available in nearly all microcontrollers and therefore requires no additional hardware, other embodiments also within the scope of these teachings.

In still another embodiment of the system of these teachings, the volatile device uses one or more capacitors.

Another approach to improving the accuracy or maximum timing duration of the SRAM clock is to build a custom eWC using a bank of specially selected low-leakage capacitors that are charged during operation, and disconnected during a power failure. After a power failure, the energy remaining on the capacitors could be measured and used to estimate the failure's duration.

This custom eWC design also requires additional hardware and would slightly increase energy consumption (to charge the capacitors). The advantages of a custom eWC are greater control over time-keeping performance. For example, a custom eWC combining a smaller capacitor with a larger one, would be able to measure short failures with greater precision without sacrificing the ability to measure long failures. Custom eWC hardware, can satisfy application needs that cannot be met by the SRAM clock.

Capacitance and other predictable electrical decay properties are used, in these teachings, to build a timekeeping mechanism for transiently-powered RFID-scale computing devices, which is referred to as an electric water clock (eWC).

As an example eWC, an SRAM clock, which uses SRAM data remanence to estimate the duration of frequent power failures, is disclosed hereinabove. The SRAM clock draws no additional power and requires substantially no additional hardware.

The remanence in SRAM is reliable enough for approximate time-keeping over short periods of time (4 s). This is sufficient for determining short timeouts or for devices that experience frequent short power failures. However, in order to enable a wider set of applications that require longer time ranges, the SRAM clock can be extended by adding capacitance to the circuit or by the use of custom eWC hardware.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Each RFID tag includes one or more processors and computer usable media having computer readable code embodied there in that instructs the one or more processors; the one or more processors and the computer usable media being operatively connected by a connection component. "Configured to," as used herein the reference to the time estimation component or the decision, processing component, or other component refers to the computer usable media having computer readable code embodied therein that instructs the one or more processors in the estimation component or the decision processing component, or other component to perform the action that the components are configured to perform.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-usable medium to perform functions of the invention by operating on input, and generating output.

Common forms of computer-usable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter Eligibility, 1300 Oil Gaz. Pat. Office 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

Although these teachings has been described with respect to various embodiments, it should be realized these teachings Is also capable of a wide variety of further and other embodiments within the spirit and scope of the claims.

What is claimed is:

1. A method for improving security of zero power devices, the method comprising:
   determining an estimate of time using a decay of data in one or more volatile devices that store data used for security;
   initializing a counter to a predetermined count; and deciding whether to respond to a query based on the estimate of time to avoid various brute-force attacks;
wherein said deciding to respond to a query comprises:
   a) determining whether data in the one or more volatile devices has substantially decayed;
   b) not responding to a query if the data in the one or more volatile devices has not substantially decayed based on, at least, voltage decay trace;
   c) decreasing the predetermined count by a predetermined decrement only if the data in the one or more volatile devices has substantially decayed;
   d) determining whether the counter is zeroed or less than zero;
   e) repeating (a) through (d) if the counter is greater than a zero; and
   f) responding to their query if the counter is zeroed or less than a zero.

2. The method of claim 1 wherein said deciding to respond to a query also comprises:
   determining if the estimate of time is greater than a predetermined time; and
   responding to a query only if the estimate of time is less than or equal to the predetermined time.

3. The method of claim 1 wherein said deciding to respond to a query also comprises:
   determining whether data in the one or more volatile devices has substantially decayed; and
   responding to the query if the data in the one or more volatile devices has substantially decayed.

4. The method of claim 3 wherein said deciding to respond to a query also comprises:
   setting at least a portion of each of the one or more volatile devices to a predetermined data value, after responding to the query.

5. The method of claim 3 also comprising:
   providing an alarm, if the one or more volatile devices have not substantially decayed.

6. The method of claim 5 also comprising:
   responding to the query, after providing the alarm.

7. The method of claim 5 also comprising:
   not responding to the query, after providing the alarm.

8. The method of claim 1 wherein the one or more volatile devices comprise SRAMs.

9. The method of claim 8 wherein determining the estimate of time using the decay of data comprises:
   measuring temperature at the SRAMs; and
   determining the estimate of time using the decay of data and the temperature.

10. The method of claim 8 wherein the one or more volatile devices also comprise one or more capacitors; and
   wherein determining the estimate of time using the decay of data comprises:
      extending resolution of the estimate of time by placing each of the one or more capacitors in parallel with each of the SRAMs.

11. A system for improving security of zero power devices, the system comprising:
   one or more volatile devices, at least a portion of the one or more volatile devices storing known data used for security;
   a data acquisition component operatively connected to the one or more volatile devices, an output of the data acquisition component being acquired data from said at least a portion of the one or more volatile devices;
   a time estimation component configured for determining an estimate of time using a decay of data in one or more volatile devices; the time estimation component receiving the output of the data acquisition component; and
   a decision component configured for deciding whether to respond to a query based on the estimate of time to avoid various brute-force attacks;
   wherein the time destination component and the decision component are comprised by:
   at least one processor device, referred to as at least one processor;
   a counter, the counter being initialized to a predetermined count; and
   at least one non transitory computer usable medium the at least one non transitory computer usable medium having computer readable code embodied therein that causes the at least one processor to:
      determine the estimate of time using the decay of data in the one or more volatile devices; and
      decide whether to respond to a query based on the estimate of time;
      wherein the computer readable code, in causing the at least one processor to decide whether to respond to a query, causes the at least one processor to:
         a) determine whether previously set predetermined data in the one or more volatile devices has substantially decayed based on, at least, a voltage decay trace;
         b) not respond to a query if the previously set predetermined data in the one or more volatile devices has not substantially decayed;
         c) decrease the predetermined count by a predetermined decrement only if the previous set predetermined data in the one or more volatile devices has substantially decayed;
         d) determine whether the counter is zeroed or less than zero;
         e) repeat (a) through (d) if the counter is greater than zero; and
         f) respond to their query if the counter is zeroed or less than zero.

12. The system of claim 11 wherein the data acquisition component is comprised by:
   the at least one processor; and
   computer readable code embodied in the at least one computer usable medium that causes the at least one processor to read data stored in the one or more volatile devices.

13. The system of claim 11 wherein the computer readable code, in causing the at least one processor to decide whether to respond to a query, also causes the at least one processor to:
   determine if the estimate of time is greater than a predetermined time; and
   respond to a query only if the estimate of time is less than or equal to the predetermined time.

14. The system of claim 11 wherein the computer readable code, in causing the at least one processor to decide whether to respond to a query, also causes the at least one processor to:
   determine whether data in the one or more volatile devices has substantially decayed; and
   respond to the query if the data in the one or more volatile devices has substantially decayed.

15. The system of claim 14 wherein the computer readable code, in causing the at least one processor to decide whether to respond to a query, also causes the at least one processor to:
   store the known data in at least a portion of the one or more volatile devices, after responding to the query.

16. The system of claim 14 further comprising:
an alarm component, the alarm component providing an alarm if the data in the one or more volatile devices has not substantially decayed.

17. The system of claim 16 wherein the computer readable code also causes the at least one processor to:
respond to the query, after providing the alarm.

18. The system of claim 16 wherein the computer readable code also causes the at least one processor to:
not respond to the query, after providing the alarm.

19. The system of claim 11 wherein the one or more volatile devices are SRAMs.

20. The system of claim 19 further comprising at least one capacitor placed in parallel with each of the SRAMs.

21. The system of claim 11 wherein the one or more volatile devices comprise at least one capacitor.

* * * * *

UNITED STATES PATENT AND TRADEMARK OFFICE
CERTIFICATE OF CORRECTION

PATENT NO.        : 9,158,361 B2
APPLICATION NO.   : 13/705410
DATED             : October 13, 2015
INVENTOR(S)       : Kevin E. Fu et al.

It is certified that error appears in the above-identified patent and that said Letters Patent is hereby corrected as shown below:

In column 16, line 6 (claim 11), "time destination component" should read --time estimation component--.

In column 16, line 12 (claim 11), "computer usable medium the" should read --computer usable medium, the--.

Signed and Sealed this
Twelfth Day of July, 2016

Michelle K. Lee
*Director of the United States Patent and Trademark Office*